United States Patent

[11] 3,582,197

| [72] | Inventor | Robert B. Eaves<br>Wayne, Pa. |
|---|---|---|
| [21] | Appl. No. | 693,633 |
| [22] | Filed | Dec. 26, 1967 |
| [45] | Patented | June 1, 1971 |
| [73] | Assignee | Photo Motion Corporation<br>King of Prussia, Pa. |

[54] PHOTOGRAPHIC ANIMATION APPARATUS AND METHOD
29 Claims, 20 Drawing Figs.

[52] U.S. Cl. ................................................. 352/43,
352/38, 352/50, 352/87
[51] Int. Cl. ........................................... G03b 21/32
[50] Field of Search........................................ 352/43, 45,
57, 58, 87, 49, 50, 38, 234, 350

[56] References Cited
UNITED STATES PATENTS

| 2,289,714 | 7/1942 | Land | 352/234 |
|---|---|---|---|
| 2,958,257 | 11/1960 | Traeger | 352/50 |
| 3,104,273 | 9/1963 | Ballance | 352/87 |
| 3,295,915 | 1/1967 | Eaves | 352/38 |
| 758,108 | 4/1904 | Sachers | 156/14X |
| 1,322,794 | 11/1919 | Kelley | 352/45 |
| 1,459,669 | 6/1923 | Berold | 156/14X |
| 1,604,082 | 10/1926 | Smothers | 101/154(UX) |
| 2,050,417 | 8/1936 | Bocca | 352/45 |
| 2,115,198 | 4/1938 | Eggert | 96/81(UX) |
| 3,235,631 | 2/1966 | Shelanski | 350/153X |

*Primary Examiner*—Samuel S. Matthews
*Assistant Examiner*—Monroe H. Hayes
*Attorney*—Fishman and Van Kirk ABSTRACT: Apparatus and method for photographic animation in which a multiaxis polarizing screen is provided with multiple printed images. Illumination through a selectively changing polarizing medium recreates the images in a selected manner to create the illusion of motion. An etched tool is employed to form the multiaxis screen by frictional orientation in a particular angular relationship. A metallic pigmented coating and contact printing are employed in creating the multiple images, and direct viewing displays may be created by a rotating polarizer or by selective illumination of spatially disposed polarizers.

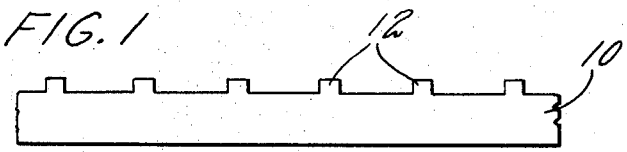
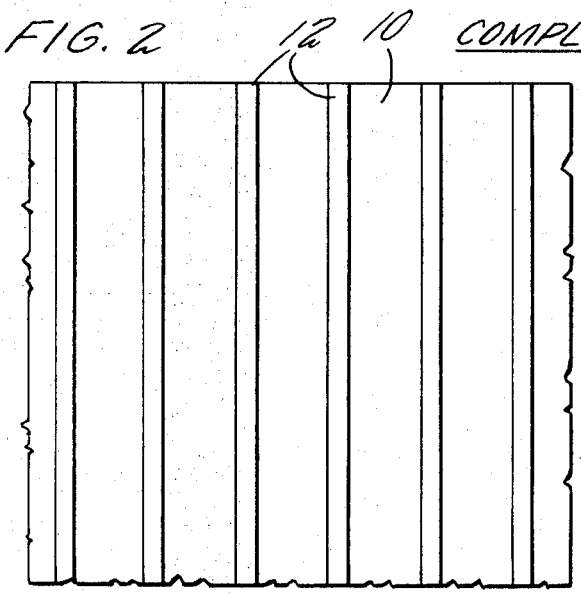
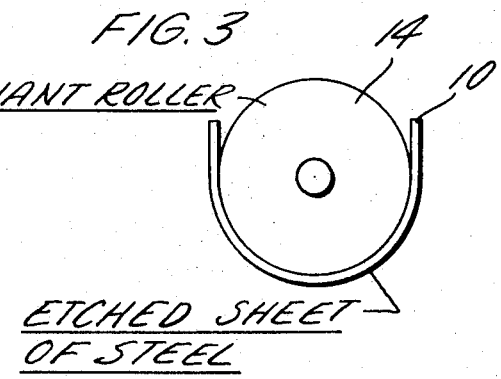
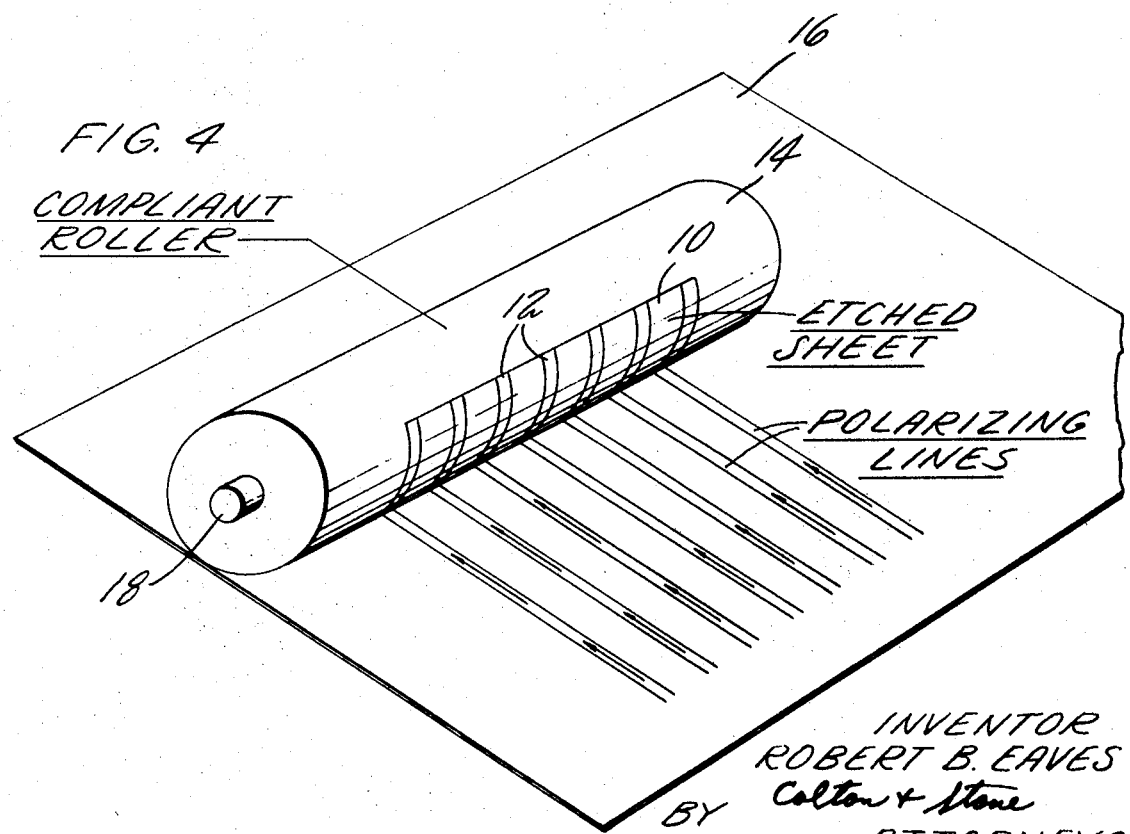

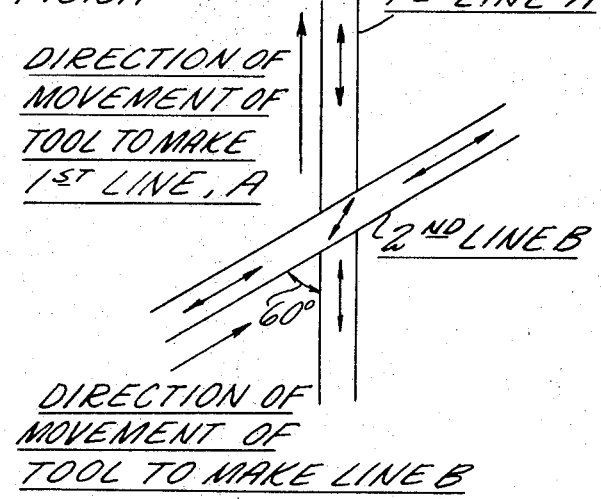
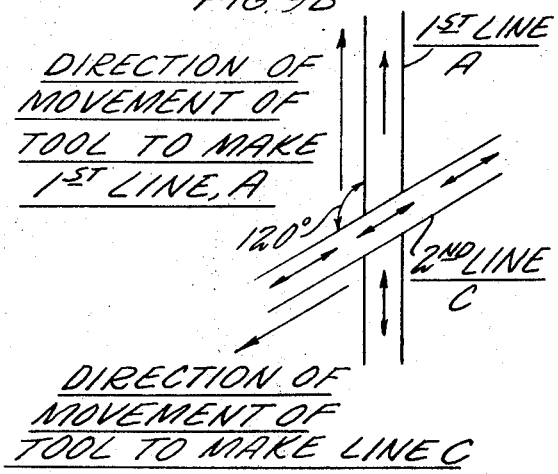
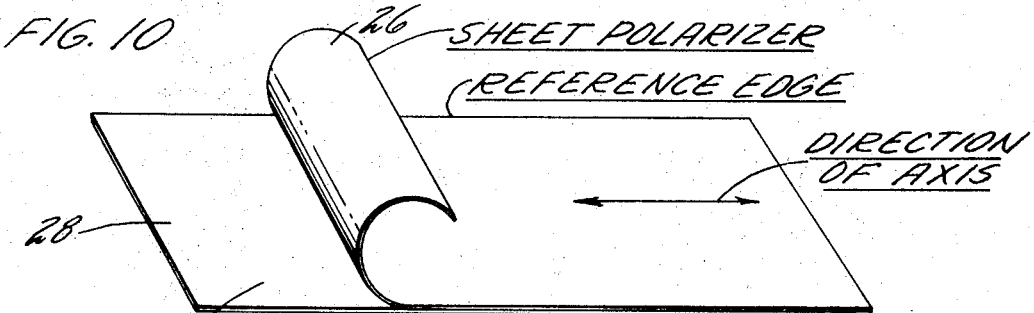
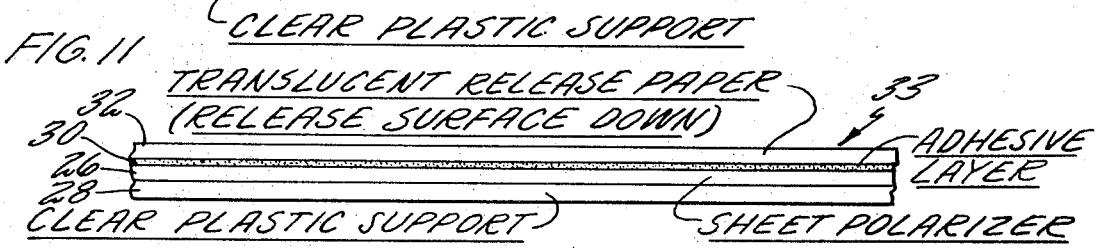
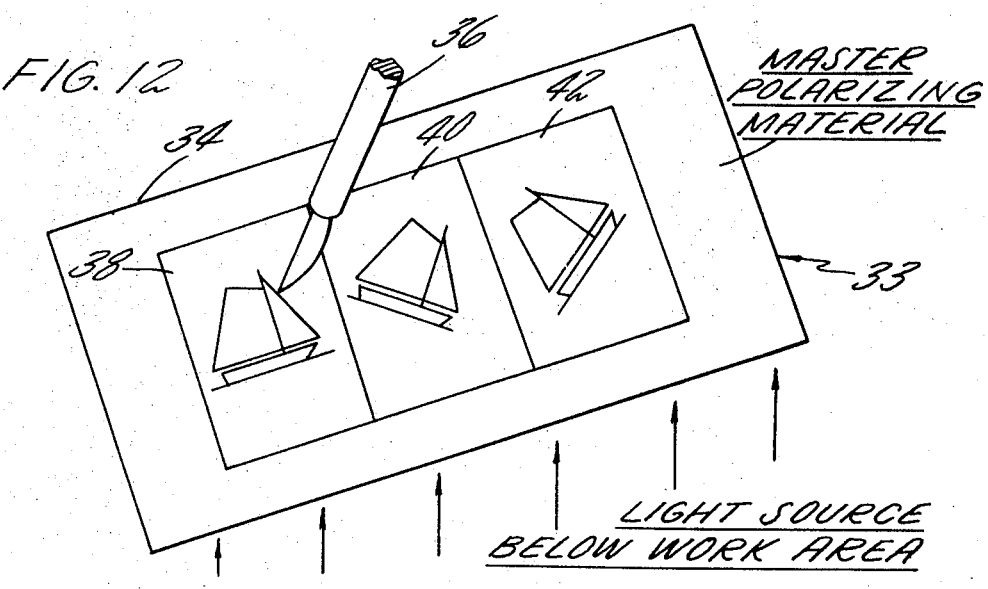

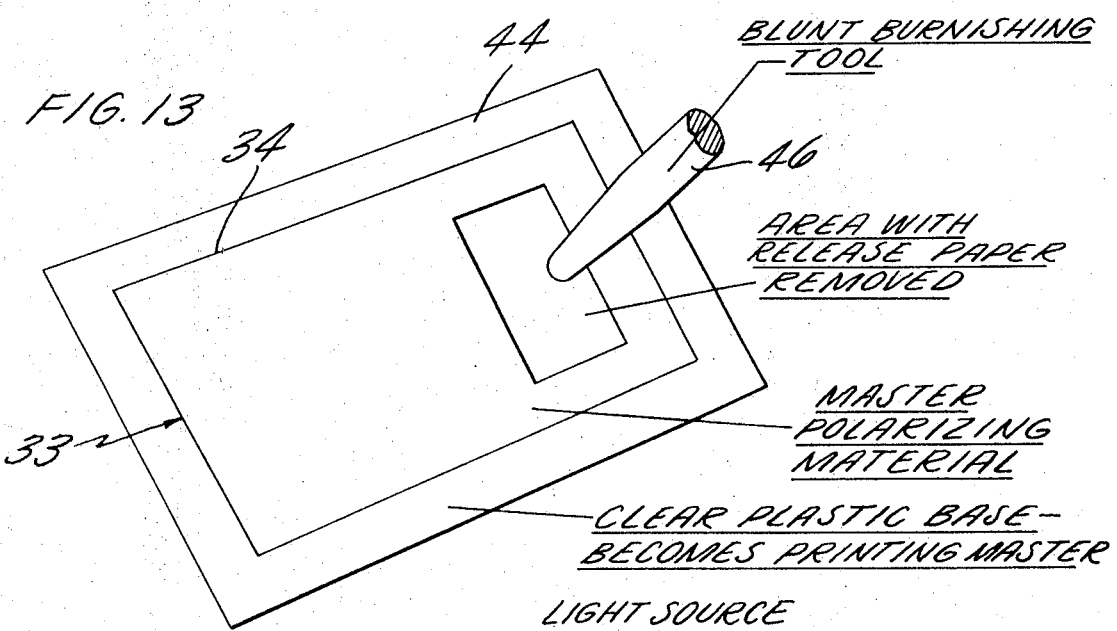
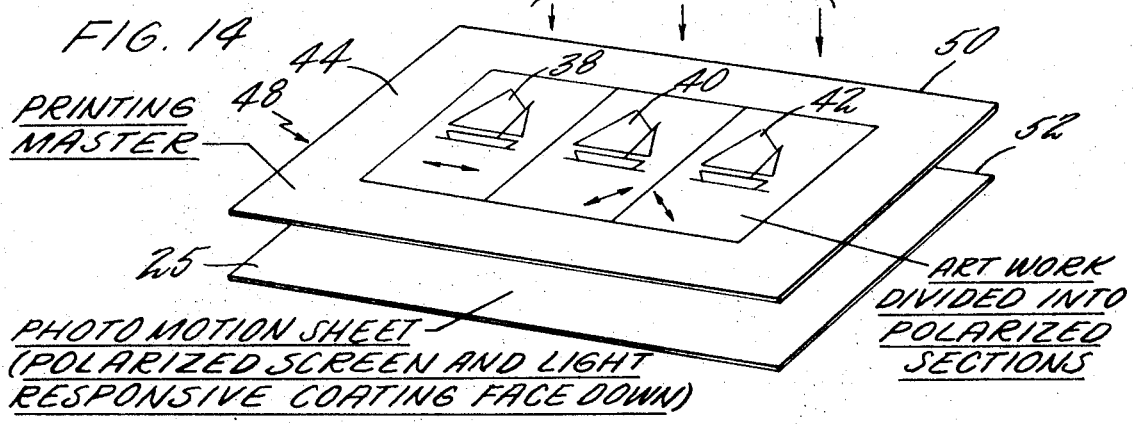
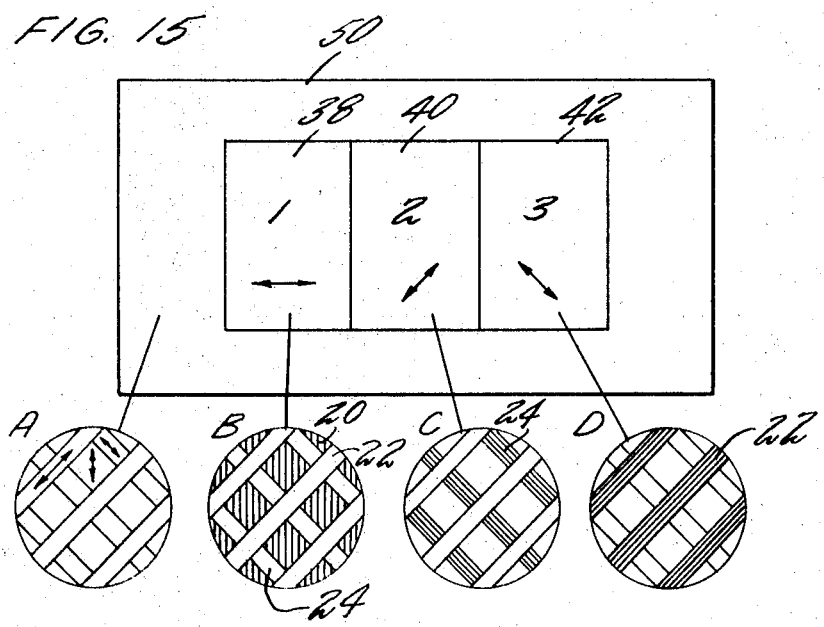

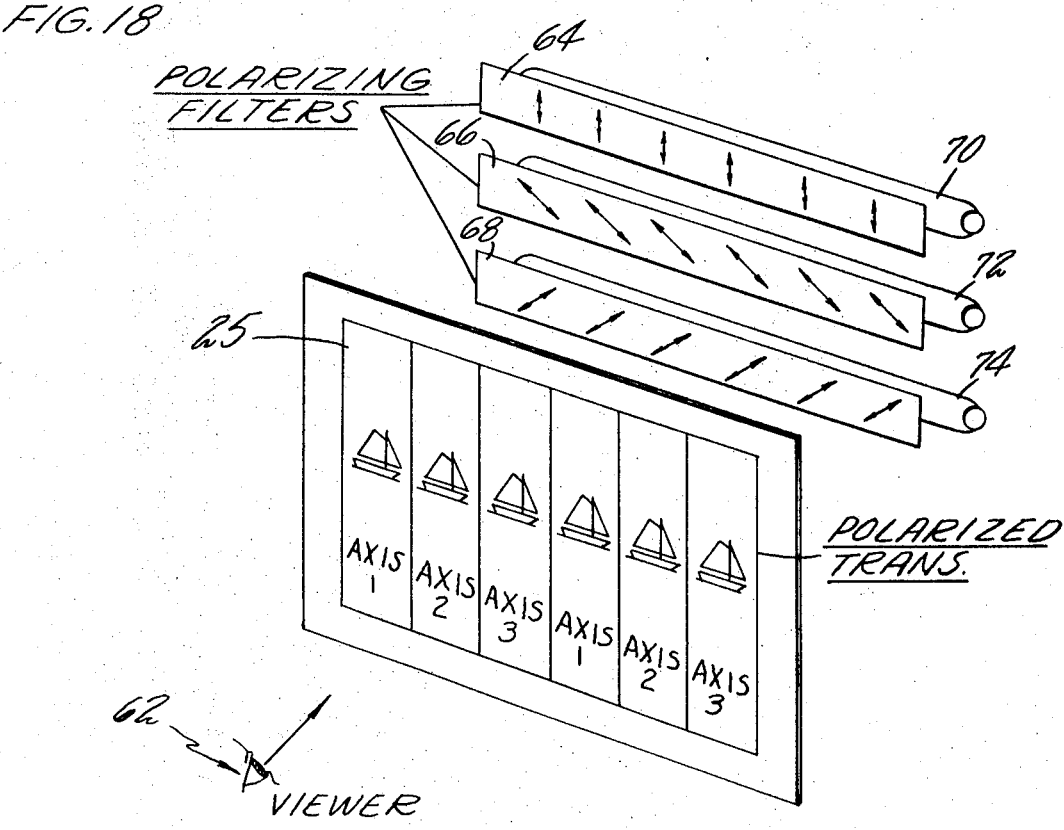

PHOTOGRAPHIC ANIMATION APPARATUS AND METHOD

BACKGROUND OF THE INVENTION

1. Field of the Invention

This invention relates to photographic apparatus and method employing polarized light in the optical projection and display of animated images. More particularly, this invention relates to photographic apparatus and method for polarized animation display employing a multiple image screen having multiaxis polarized areas, the polarized areas being produced by an etched tool, and the images being produced by contact printing.

2. Description of the Prior Art

Systems have been proposed in the past relating to photographic animation through the use of polarizing techniques. Illustrations of the techniques in this field may be seen in such U.S. Pats. as Boone, No. 2,977,845, Ballance, No. 3,104,273 and Eaves, No. 3,295,915, the latter of which is assigned to the assignee of the present application.

SUMMARY OF THE INVENTION

In the present invention an etched burnishing tool is employed to generate a multiaxis light polarizing screen by drawing the tool over the surface of the screen in a series of directions, each of which has a particular angular relationship to the previous direction. Contact printing is employed to selectively expose an emulsion on this screen, with different contact printing images being coordinated with different polarizing axes of the screen. A screen is thus produced having a plurality of polarized images having different planes of polarization, and displays of these images are recreated by exposing the screen to polarized light which successively coordinates with the polarizing axes of the screen.

Accordingly, one object of the present invention is to provide a novel apparatus and method for polarized photographic animation.

Another object of the present invention is to provide novel apparatus and method for polarized photographic animation employing a multipolarized axis emulsified screen.

Still another object of the present invention is to provide novel polarized photographic animation apparatus and method employing a polarized multiaxis emulsified screen having contact printed images.

Still another object of the present invention is to provide a novel polarized photographic animation apparatus and method employing an etched burnishing tool for polarization.

Still another of the present invention is to provide a novel polarized photographic animation apparatus and method having substantially greater simplicity than heretofore known.

Other objects and advantages will be apparent and understood from the following detailed description and drawings.

BRIEF DESCRIPTION OF THE DRAWINGS

FIG. 1 and 2 are elevation and plan views, respectively, of a segment of an etched sheet employed in a burnishing tool for producing desired polarized zones.

FIG. 3 is a view showing the etched sheet being applied to a roller.

FIG. 4 is a view showing the etched sheet employed as a burnishing tool.

FIG. 9a and 9b show two different relationships in forming overlapping polarized zones, the relationship of FIG. 9a being undesirable and the relationship of FIG. 9b being required for proper operation.

FIG. 10—15 show successive steps in the formation of images on a multiaxis screen in accordance with the present invention.

FIGS. 16a and 16b illustrate display apparatus and a display in accordance with the present invention.

FIG. 17 and 18 illustrate an alternative display apparatus and display in accordance with the present invention.

DESCRIPTION OF THE PREFERRED EMBODIMENTS

Figure 5:
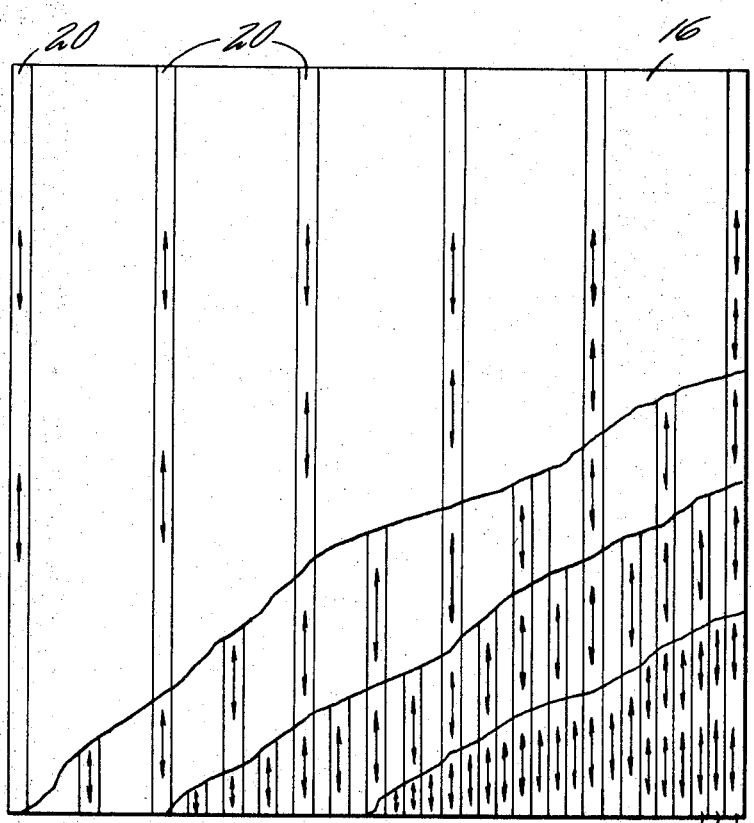
FIGS. 5, 6 and 7 are representations of angularly disposed polarized zones on a polarizable sheet as employed in the present invention, FIG. 6 being fragment of FIG. 5 and showing two overlapping zones, and FIG. 7 being a fragment of FIG. 6 showing three overlapping zones.

Referring now to FIGS. 1—4, there is shown a tool particularly suitable for use in producing a diversely polarized screen in accordance with the present invention. A sheet of stainless steel 10, or other metal, is etched by standard photofabrication techniques to form a contoured cross section as shown in FIG. 1 having a plurality of equally spaced ridges 12. The peripheries of the ridges 12 will be sharply defined and straight because of the accuracy of photofabrication and etching techniques, and ridges 12 will also have flat upper surfaces. As shown in FIG. 2, the ridges 12 will preferably extend along the entire length of sheet 10.

As shown in FIG. 3, the sheet 10 is adhered to a compliant roller 14, the sheet being shown in FIG. 3 in the process of being adhered. FIG. 4 shows the sheet 10 adhered to the roller 14 whereby the ridges 12 extend circumferentially about the roller and present raised surfaces for engagement with a sheet 16 of polarizing material. The tool 16 would be held, such as by end handles 18 (only one of which can be seen in FIG. 4), in a jig or fixture, and the sheet 16 would be secured to a flat bed. The bed would be moved with respect to roller 14 with sheet 16 in contact with ridges 12 so that the sheet would be drawn under the ridges to form polarizing lines in the sheet as indicated.

The etched tool disclosed herein possesses several significant advantages over the wire burnishing tool previously disclosed in my prior U.S. Pat. No. 3,245,915. The etched tool is more economical to produce since it eliminates hand assembly; the etched tool has longer tool life since sheet 10 may be several inches long and thus can be rotated relative to its own support roll 14 or the sheet 16 to present a new burnishing surface for engagement with sheet 16; the etched tool has improved consistency because it eliminates hand variations that are inevitable with the manual assembly of the wire tool; and the etched tool provides improved and more sharply defined polarizing lines because of the flat burnishing surface presented by the flat upper surface of the ridges 12.

Figure 6:
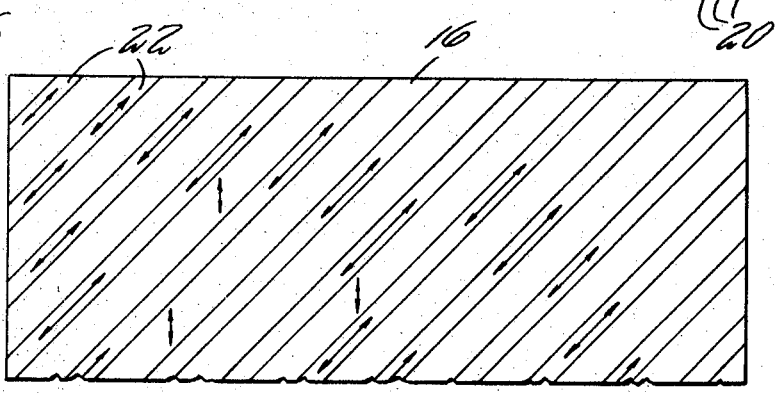
Figures 7, 8:
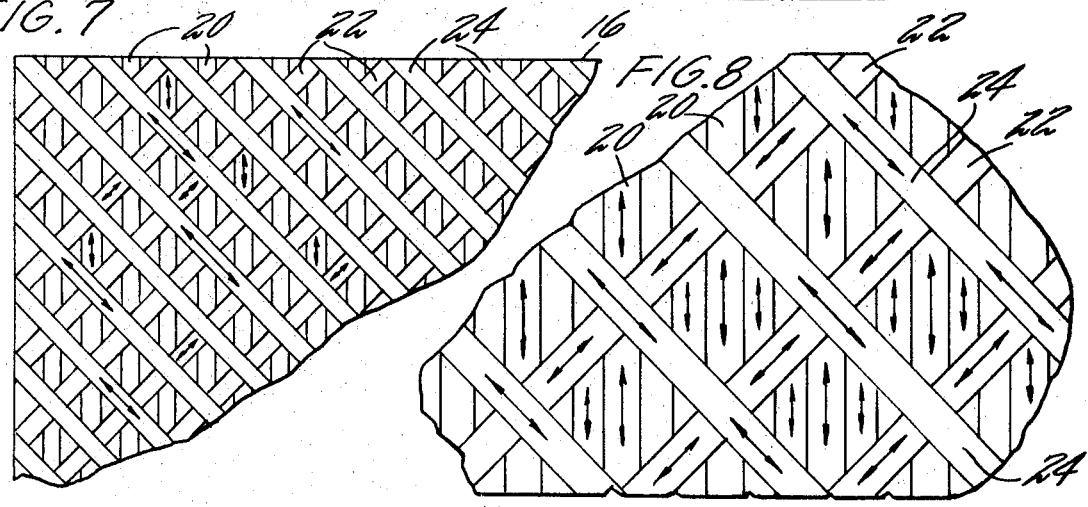
FIG. 8 shows a fragmentary section of FIG. 7 showing three overlapping zones in enlarged detail.

Referring now to FIGS. 5, 6 and 7, a sheet 16 is shown with multiaxis polarizing lines burnished therein. It is known that light polarizers can be generated by frictionally orienting the surface of many materials and staining the oriented molecules with a dichroic stain. Polyvinyl alcohol is particularly well suited for such frictional orientation. The polyvinyl alcohol sheet may be a cast sheet, a thin film laminated to a transparent support, a liquid coating on a transparent support or a coating chemically generated on the surface of such materials as polyvinyl acetate or polyvinyl butyral. The sheet will preferably be a cast transparent film of 0.003 inches thickness having approximately 4 percent water content.

It is desirable to stain only one surface of the polyvinyl alcohol sheet 16, i.e. the surface that engages the ridges 12, and thus the opposite surface is coated with a transparent water repellent during manufacture. Dow Chemical resin No. OX-2168 has proven to be a satisfactory water repellent, and this resin coating protects sheet 16 from changes in water content to prevent curling and also contributes to constant staining in a standard dichroic stain solution. A particularly suitable dichroic stain is Vectograph ink manufactured by the Poloroid Corporation, this being a water solution of iodine and iodides. Sheet 16 is submersed in a dilute solution of the ink to stain the surface which is not covered by the water repellent resin. The percent dilution of the dichroic solution is not of major significance, and the length of time of submersion can be varied to produce acceptable results at any reasonable ratio of stain to water; however, for purposes of standardization a solution of one part ink in five parts of water is effective.

The width of each of the ridges 12 is from 0.0015 inches to 0.0025 inches so that lines of that size range are formed when the sheet 16 is pulled under roller 14. Since there are a multiplicity of ridges 12, a multiplicity of first parallel polarized lines 20 (see FIG. 5) are formed in sheet 16 when the sheet is first drawn under the burnishing tool. The lines are polarized in the direction indicated by the double-ended arrows. These first parallel lines 20 are arranged parallel to two edges of sheet 16 and perpendicular to two other edges of sheet 16. After sheet 16 has been moved with respect to the burnishing tool to form the first set of parallel lines 20, the sheet is then laterally displaced with respect to the spacing between parallel lines 20, and another group of similarly oriented parallel polarized lines are formed in sheet 16. This process is repeated with successive lateral displacements of sheet 16 with respect to the burnishing tool until substantially the entire surface of sheet 16 has been burnished to provide an array of first parallel lines 20 as illustratively indicated in the lower right corner of FIG. 5.

Referring now to FIG. 6, the sheet 16 is then rotated 120°, and second parallel polarized lines 22, polarized in the direction of the double-ended arrows, are formed by drawing the sheet under the burnishing tool. The sheet may then be laterally displaced with respect to the spacing between the lines 22 and additional lines 22 formed by one or more additional passes of the sheet with respect to the burnishing tool. However, as indicated in FIG. 6, the lateral displacement between successive passes and the number of passes is such that the surface of sheet 16 is not entirely covered by the second parallel lines 22. Rather, the number of second lines 22 is less than the number of first lines 20, and there is a spacing between the second lines 22 so that the first lines 20 (represented by the vertical polarization indicating arrows) are visible between the lines 22.

Referring now to FIG. 7, the sheet 16 is again rotated another 120° and the burnishing cycle is repeated by drawing the sheet under the ridges 12 to form third parallel polarizing lines 24 polarized in the direction of the double-ended arrows. Once again, the sheet 16 may be laterally displaced with respect to the spacing between the lines 24 to perform one or more additional burnishing passes; however, the displacement and number of passes are such that the number of third parallel polarizing lines 24 is less than the number of second parallel polarizing lines 22, and there is spacing between the third parallel polarizing lines 24 so that both the first lines 20 and the second lines 22 are visible therebetween.

Referring now to FIG. 8, an enlargement is shown of the final condition of sheet 16 which has been transformed by the three burnishing steps into a multiaxis polarizing screen. The final screen is a three-axis screen having three successive polarization axes displaced 120° with respect to each other as indicated by the polarization plane of vibration arrows corresponding to the first, second and third parallel lines 20, 22 and 24. As indicated above, the total number of lines diminishes for each successively drawn group of lines, the ultimate intention being that there be equal areas of exposed and unobstructed lines visible in each direction. That is, the intention is that the area of lines 20 not overlayed by either lines 22 or lines 24 be equal to the area of lines 22 not overlayed by lines 24, and that both these exposed areas of lines 20 and 22 be equal to the total area of lines 24. This equality of exposed area is desired so that there will be equal intensity of illumination in the final display regardless of whether a display is being generated through either the first, the second or the third parallel polarizing lines. More than three sets of lines could be formed, but three sets are preferred.

Referring now to FIGS. 9a and 9b, a critical relationship between overlapping polarization lines is shown. It has been previously thought that when a second (or any subsequent) burnished line intersects a first (or any previous) burnished line, the direction of polarization of the area of intersection between the two would be in the direction of the second burnished line. However, it has now been discovered that variations can occur in the direction of polarization in the area of intersection depending on such factors as variations in the softness of the polyvinyl alcohol surface, variations in molecular structure, and the coefficient of friction in the burnishing operation. Control of the polarization in the areas of intersection is, of course, critical because distorted or interrupted images will be formed if the polarization in the area of intersection does not conform with a direction of polarization of one of the two lines making up the intersection.

It has been discovered that control of intersection polarization is a function of the direction of relative movement of the tool and the sheet in forming the second (and subsequent) lines compared to the direction of relative movement between the tool and sheet in making the first line. More specifically, it has been discovered that the direction of movement of the tool (or the sheet, if the sheet is moved rather than the tool) in forming the second line should be at an angle not less than 90° with respect to the direction of movement in forming the first line.

FIG. 9a illustrates a situation in which first and second lines have been formed having polarization directions as indicated by the double-ended arrows in each line. The direction of movement in forming each line is as shown by the labeled arrow next to each line, and it can be seen that the direction of movement in forming the second line was 60° with respect to the direction of movement in forming the first line (i.e. the angle included between the first and second lines was 60°). As indicated by the double-headed arrow in the area of intersection between the first and second lines, the polarization direction in the intersection area did not conform to the polarization direction of either the first line or the second line, thus producing an extremely undesirable condition.

In FIG. 9b the direction of movement of the formation of the second line with respect to the formation of the first line is 120°. That is, the angle included between the directions of movement in forming the two lines is 120°. As shown in FIG. 9b, the direction of polarization in the area of intersection between the first and second lines conforms to the polarization direction of the entire second line, and FIG. 9b illustrates the general rule to be followed in forming the intersecting burnished polarization lines, the rule being that the relative directions of motion in forming any two intersecting lines (i.e. the included angle between the two lines in formation) should be not less than 90° in order to insure that the direction of polarization in the area of intersection will conform to the direction of polarization of the second line.

The application of this general rule can be illustrated by again referring to FIGS. 7 and 8. Assuming that the vertical lines 20 are formed by a motion which causes the burnishing tool to move from the bottom of the paper toward the top of the paper, then the lines 22 should be formed by a motion of the burnishing tool from the upper right corner of the paper toward the lower left corner of the paper, and the lines 24 should be formed by a motion from the upper left corner of the paper toward the lower right corner of the paper.

Theoretically, more than three directions of parallel polarizing lines could be employed, but three groups of lines as described are preferable.

After the burnishing operation, a light sensitive coating is then applied to the burnished surface of screen 16. It is preferable to employ a heat reflecting image in the final animated display so that high wattage projection can be employed without damage to the polarizing screen. A metallic aluminum image may be efficiently obtained by the use of light sensitive emulsions that can be generally referred to as bichromated colloids, of which bichromalized gelatin is a well known example. A coating of such material is rendered insoluble in water when exposed to light, and images may be formed by exposing the coating under a negative and then washing away the water soluble parts. Pigments can be included in the coating to make the image visible, and metallic aluminum pigments provide the desired heat reflecting image.

Variations of this image forming technique have been developed in recent time in photoetching technology generally used in the manufacture of printed circuits in the electronics industry. In a highly preferable coating, the bichromatized gelatin is replaced with Kodak Ortho Resist (KOR) manufactured by Eastman Kodak Company. The KOR is obtained in liquid form, and may be spread on the burnished surface of the sheet 16 with a Mayer bar, and an aluminum pigment may be incorporated to provide the desired heat reflecting image. Development consists of washing away the soluble parts, after exposure, in a tank of known solvent such as trichlorethelene. Neither the KOR nor the solvent affect the multiaxis polarizing screen 16 or the dichroic stain (thus, a protective coating is not required on screen 16). The KOR emulsified sheet provides good contrast between light and dark areas and high resolution. By way of one particular example, one gram of No. 422 Alcoa aluminum powder in 10 milliliters of KOR, spread on the surface of the sheet 16 with a No. 20 Mayer bar produces, after proper exposure, an efficient reflecting image that will survive indefinitely in a high wattage projecting system. The screen 16 with emulsion thereon will sometimes hereinafter be referred to as a photomotion sheet 25 (see FIG. 14).

Other coatings may be employed, especially in low wattage systems where the polarized screen may not be exposed to heat damage. Photographic emulsions of gelatin and silver salt may be employed, and the "LITHO" emulsion manufactured by the Anken Chemical and Film Corporation of Newton, New Jersey is particularly suitable. However, the polyvinyl alcohol material and the dichroic stain of sheet 16 are soluble in the water of this "LITHO" emulsion, and thus screen 16 would first have to be coated with a transparent protective material if this emulsion were employed. After application of the protective coating and this "LITHO" emulsion, development, washing and fixing could be performed in accordance with standard photographic techniques.

The completed screen 25 may require a protective coating such as a clear resin No. OX-2163 manufactured by Dow Chemical Co. to provide an efficient protection against water vapor. A subsequent tough and clear exterior coating may then also be applied, such as Polyvar, a polyurethane coating manufactured by the Varcraft Pain Company. Each of these protective coatings may be dip coated.

In addition to resist emulsions and "LITHO" photographic emulsions as discussed above, heat sensitive coatings may also be employed in coating sheet 16. These heat sensitive coatings are transparent coatings capable of undergoing irreversible visible change when momentarily heated to a predetermined elevated temperature. Examples of heat sensitive coatings are:

1. an aqueous solution of nickel acetate, nickel nitrate, ammonium thiosulfate, and thiourea;

2. an aqueous solution of lead acetate, thiourea and acetic acid;

3. a mixture of methylene blue and mercuric sterate in xyol solution of ethyl cellulose.

High energy light sources suitable for exposing these heat sensitive coatings are:

1. 1000 watt tungsten in a quartz tube at a distance of from 2 to 3 inches from the material;

2. photo flash bulbs;

3. pulses xenon (as used in graphic arts) for a brief exposure interval such as 0.5 seconds.

Turning now to a consideration of FIGS. 10—15, the technique for printing images on the emulsified multiaxis screen 16 (photomotion sheet 25) will be discussed. Although a variety of art printing techniques might be employed, the preferred technique to be discussed herein is a contact printing technique which minimizes the number of operations, the skill and the tooling required.

Referring to FIG. 10, the contact printing technique is initiated with a sheet polarizer 26 mounted on a clear plastic base 28. One edge of sheet 26 is shown separated from base 28 for purposes of illustration, but it will be understood that the polarizer sheet 26 is mounted flat on support base 28. The polarized sheet 26 is polarized in the direction indicated by the double-headed arrow.

Referring now to FIG. 11, an elevation view is shown of sheet polarizer 26 mounted on a clear plastic base 28. In addition, sheet polarizer 26 is coated with a thick adhesive layer 30 on the side removed from support 28, and adhesive layer 30 is covered with a sheet of translucent release paper 32 with the release surface in contact with adhesive 30. The release surface forms a very light bond with the adhesive and may be easily removed. The assembly shown in FIG. 11 will sometimes be referred to as a master polarizing material 33.

FIG. 12 shows a perspective view of the master polarizing material 33 of FIG. 11, and one edge, e.g. the top edge 34 is considered as a reference edge for subsequent alignment orientation with the axes of the first, second and third polarizing lines of screen 16.

The composite structure of FIG. 11 forms a master translucent printing sheet. By placing this sheet on a standard light table with release paper 32 up and clear plastic support 28 on the table, images may be formed or defined by cutting the master polarizing material 33 with an art knife 36 as illustrated in FIG. 12. The images may be traced with the art knife by placing the images on the art table below plastic base 28 and illuminating from below in a standard fashion as illustrated by the arrows in FIG. 12 which represent light from a source below the assembly. The art knife penetrates the release paper 32, the adhesive layer 30 and sheet polarizer 26.

A number of art images are drawn and cut for subsequent use in animation display. By way of example, FIG. 12 shows three images 38, 40 and 42 of a boat. The axis of polarization of sheet 26 is parallel to reference edge 34. Assuming that each of the images 38, 40 and 42 has a common imaginary reference line such as the mast of the boat, the image 38 will be oriented perpendicular to reference edge 34 so that the plane of polarization of image 38 is parallel to edge 34. The imaginary reference line of image 40 would be arranged at an angle of 60° with respect to edge 34 so that the plane of polarization of image 40 would be at an angle with respect to edge 34 and also at an angle with respect to the plane of polarization of image 38. Similarly, the imaginary reference line of image 42 would be oriented at an angle of 120° with respect to edge 34 so that the plane of polarization of image 42 is angled with respect to edge 34 and also with respect to images 38 and 40.

The release paper is then removed from the cut sections to expose the adhesive 30 over the sheet polarizer 26 in the cut areas. As shown in FIG. 13, the master polarizer material 33 is then inverted over a sheet of clear plastic 44, and the areas with the release paper removed are burnished with a blunt burnishing tool 46 applied to the bottom side of clear plastic base 28. Recalling that the art knife penetrates the release paper 32, the adhesive layer 30 and sheet polarizer 26, the burnishing step causes the cut segments of sheet polarizer 26 to transfer to plastic sheet 40 to which they are bonded by the adhesive.

Referring now to FIG. 14, the images 38, 40 and 42 bonded to clear plastic sheet 44 form a printing master 48 having a reference edge 50 corresponding to reference edge 34 of the master polarizing material 33. The images 38, 40 and 42 bonded to sheet 44 are all arranged so that their imaginary reference lines (the masts) are perpendicular to edge 50. Thus, the plane of polarization of image 38 is parallel to edge 50 while the planes of polarization of images 40 and 42 are each at an angle with respect to edge 50, as indicated by the double-ended polarization indication arrows on each image.

Still referring to FIG. 14, the printing master 48 is then placed over the multiaxis photomotion sheet 25. The photomotion sheet is placed face down, i.e. with its multiaxis polarized screen and light sensitive surface down, and the printing master 48 is positioned with its polarized images 38, 40 and 42 down with reference edge 50 parallel to edge 52 of photomotion sheet 25. Light is then introduced to the assembly as indicated by the light source lines in FIG. 14.

Referring now to FIG. 15, the patterns of light passage are shown through the overlay of printing master 48 on photomotion sheet 25. The images 38, 40 and 42 are indicated without the art work merely for ease of illustration, and the numerals 1, 2 and 3 indicate sections of photomotion sheet 25 beneath images 38, 40 and 42, respectively. Light passage through the multiaxis photomotion sheet 25 is as indicated in the enlarged areas A, B, C and D. The area labeled A corresponds to the entire area of photomotion sheet 25 over which there is no cutout image (i.e. the boat in the present example). Since there is no polarized area on printing master 48 corresponding to any of the area A, the light passes through printing master 48 and photomotion sheet 25 and exposes the photographic emulsion on the downward facing side of sheet 25 in all of the area A. The light incident on image 38 is polarized in a direction parallel to edge 50 as indicated by the double-ended arrow, and this polarized light then passes to screen 25. This polarized light incident on screen 25 is perpendicularly crossed with respect to polarization lines 20 in sheet 25; and thus no light is transmitted to the photographic emulsion covering the lines 20 in area B under image 38. Some light is transmitted in the direction of lines 22 and 24, and thus the emulsion in area B under image 38 covering lines 22 and 24 is exposed. In a similar manner, the light passing through images 40 and 42 leaves unexposed the lines 24 and 22 in areas C and D under images 40 and 42, respectively, while exposing the other lines in those areas. In B, C and D the unexposed areas are indicated by dark lines, but it will be understood that the polarization of these lines is not effected by the exposure step.

The process described immediately above with respect to FIG. 15 creates an image which is then developed to a positive by immersion of the screen in a suitable solvent (e.g. trichlorethylene if the emulsion is KOR) whereby the unexposed emulsion is washed away. Thus, the light areas in A, B, C and D become opaque and the dark areas become clear and light transmissive. The development step completes the formation of the finished photomotion screen 25. It will be understood that a negative transparency could be created rather than the positive transparency as described.

The finished screen is then incorporated in a display system in accordance with the example illustrated in FIGS. 16a and 16b. The finished screen 25 is mounted in a shadow box 54 which contains a rotating polarizer disc 56, powered by a motor 58, and a light source 60. The screen would be viewed from the left by a viewer as indicated representatively at 62 in FIG. 16a.

FIGS. 16b shows the display as it would be seen on screen 25 by the viewer in coordination with the rotation of rotating polarizer disc 56. When disc 56 is in the position such that its axis of polarization is vertical, display light from source 60 is transmitted through both the lines 20 and the previously described area B in screen 25, and the image of the boat appears on the left portion of the screen. As polarizer 56 rotates (assuming counterclockwise rotation), its axis of polarization becomes aligned with lines 24 in area C of screen 25, and the image of the boat then appears in the center of the screen. Similarly, as disc 56 continues to rotate the image of the boat next appears at the right of the screen when the direction of the polarization axis of disc 56 lines up with lines 22 in area D of screen 25. It will be understood that there is only one disc 56, and the three illustrations of that disc in FIG. 16b are for the purpose of showing the rotated position of the disc in coordination with the appearance of the image on the several sections of the screen.

As can be seen from the foregoing discussion, the ship appears to move across the screen from left to right from the left position to the intermediate position and then to the right position, and it then reappears again at the left position and appears to again move across the surface of the screen. This continued movement across the screen left to right from position to position will continue as long as disc 56 is being rotated.

It will be understood that a boat has been shown merely for purposes of illustration. Many other forms of art work could be employed, for example, (but only by way of illustration) a moving arrow or any type of radiating lines. Rotating motion can also be displayed very effectively by dividing a circle into segments polarized in different directions in screen 25 and then successively illuminating the various sections. Light will be transmitted through various sections in accordance with the polarization, and an effective illusion of motion will be created by the transmission and blockage of light through the various sections in predetermined order.

Referring now to FIGS. 17 and 18, an alternative display method is shown which is particularly suitable for outdoor displays. Rotating disc 56 is replaced with fixed separate polarizing filters 64, 66 and 68, each of which is polarized in a direction indicated by the double-ended arrows in FIG. 18. Banks of lamps are associated with each of the polarizers, the banks of lamps being indicated generally at 70, 72 and 74 and being equal in number to the number of axes of polarization of sheet 25. The lamps are powered by a switching device 76 that applies electric power to one lamp circuit at a time. Polarizers 64, 66 and 68 are mounted so that the polarizing axis of each is parallel to one axis of sheet 25. Thus, when the lamps are switched in sequence, the polarized areas of sheet 25 are successively bright and dim. FIG. 18 illustrates the display seen by a viewer 62. The FIG. 18 display would have two boats moving from left to right and successively displayed in the positions indicated by axis 1, axis 2 and axis 3 as the lights are switched.

While a preferred embodiment has been shown and described, various modifications and substitutions may be made without departing from the spirit and scope of this invention. Accordingly, it is to be understood that this invention has been described by way of illustration rather than limitations.

What I claim is:

1. A photographic animation method including the steps of:
   forming a polarizing screen having a plurality of polarizing axes angularly disposed with respect to each other;
   coating one surface of said screen with a radiation responsive emulsion;
   defining a plurality of images to be displayed, said images being defined by viewing images through polarizing material and cutting said material commensurate with said viewed images, at least some of said images being similar and being oriented to have their axes of polarization angled with respect to each other;
   orienting the polarization axes of said images with respect to the polarization axes of said screen;
   delivering radiation to said oriented images to selectively pass radiation to said screen to selectively expose the emulsion on said polarizing screen and form areas of varying polarized light transmission commensurate with said images; and
   delivering display illumination to said exposed screen, said display illumination being polarized and having a varying axis of polarization, whereby said images are displayed in a predetermined order.

2. A photographic animation method as in claim 1 including:
   cutting at least some of said images at different predetermined orientations with respect to the axis of polarization of the material.

3. A photographic animation method as in claim 2 including:
   coating said material with an adhesive layer and a release paper prior to cutting.

4. A photographic animation method as in claim 8 wherein the step of orienting the polarization axes of said images with respect to the polarization axes of said screen includes:
   contact printing said images.

5. A photographic animation method as in claim 4 wherein the step of contact printing includes:

coating said material with an adhesive layer and a release paper prior to cutting;

cutting said material, adhesive and release paper commensurate with said images, at least some of said cuttings being at different predetermined orientations with respect to the axis of polarization of the material;

removing the release paper from the cuttings; and adhering said cuttings to a printing surface.

6. The photographic animation method of claim 1 wherein said step of selectively exposing the emulsion on said screen and forming areas of varying polarized light transmission includes:

developing the exposed emulsion to selectively remove parts thereof.

7. A photographic animation method as in claim 6 wherein the step of orienting the polarization axes of said images includes:

crossing the polarization axis of each image with respect to at least one of the polarizing axes of said polarizing screen whereby the selective exposure of emulsion on an area of said polarizing screen is a selective exposure along said polarizing axes of said screen commensurate with the orientation of an image with respect to said area.

8. A photographic animation method including the steps of:

forming a polarizing screen having a plurality of polarizing axes angularly disposed with respect to each other by burnishing the screen in a first direction and then burnishing the screen in at least second and third directions, each of said second and third burnishings including overlapping previously burnished parts and being at an angle not less than 90° with respect to the immediately preceding direction of burnishing;

coating one surface of said screen with a radiation responsive emulsion;

defining a plurality of images to be displayed, said images being defined in polarizing material, and at least some of said images being similar and being oriented to have their axes of polarization angled with respect to each other;

orienting the polarization axes of said images with respect to the polarization axes of said screen;

delivering radiation to said oriented images to selectively pass radiation to said screen to selectively expose the emulsion on said polarizing screen and form areas of varying polarized light transmission commensurate with said images; and delivering display illumination to said exposed screen, said display illumination being polarized and having a varying axis of polarization, whereby said images are displayed in a predetermined order.

9. A photographic animation method as in claim 8 wherein:

the steps of burnishing said screen in second and third direction includes burnishing in a manner so that the areas of said screen burnished in any one direction and not overlapped by burnishing in any other direction are approximately equal.

10. A photographic animation method as in claim 8 wherein:

said step of applying an emulsion includes applying a light responsive emulsion.

11. A photographic animation method as in claim 8 wherein:

said step of applying an emulsion includes applying a light responsive photoresist material.

12. A method of generating a polarizing screen for photographic animation display including the steps of:

burnishing the surface of a polarizing sheet in a first direction;

then burnishing said surface in a second direction, said second burnishing including overlapping previously burnished parts, and said second direction being at an angle not less than 90° with respect to the first direction; and then burnishing said surface in a third direction, said third burnishing including overlapping previously burnished parts, and said third direction being at an angle not less than 90° with respect to the second direction.

13. A method of generating a polarizing screen for photographic animation display as in claim 12 including the steps of:

coating one surface of said screen with a radiation responsive emulsion;

defining a plurality of images to be displayed, said images being defined in polarizing material, and at least some of said images being similar and being oriented to have their axes of polarization angled with respect to each other;

orienting the polarization axes of said images with respect to the polarization axes of said screen; and delivering radiation to said oriented images to selectively pass radiation to said screen to selectively expose the emulsion on said polarizing screen and form areas of varying polarized light transmission.

14. A method of generating a polarizing screen for photographic animation display as in claim 13 wherein:

said step of applying an emulsion includes applying a light responsive emulsion.

15. A method of generating a polarizing screen for photographic animation display as in claim 13 wherein:

said step of applying an emulsion includes applying a light responsive photoresist material.

16. A method of generating a polarizing screen for photographic animation display as in claim 13 wherein the step of orienting the polarization axes of said images with respect to the polarization axes of said screen includes:

contact printing said images.

17. A method of generating a polarizing screen for photographic animation display as in claim 16 wherein the step of contact printing includes:

coating said material with an adhesive layer and a release paper prior to cutting;

cutting said material, adhesive and release paper commensurate with said images, at least some of said cuttings being at different predetermined orientations with respect to the axis of polarization of the material;

removing the release paper from the cuttings; and adhering said cuttings to a printing surface.

18. A method of generating a polarizing screen for photographic animation display as in claim 13 wherein said step of selectively exposing the emulsion on said screen and forming areas of varying polarized light transmission includes:

developing the exposed emulsion to selectively remove parts thereof.

19. A method of generating a polarizing screen for photographic animation display as in claim 18 wherein the step of orienting the polarization axes of said images includes:

crossing the polarization axis of each image with respect to at least one of the polarizing axes of said polarizing screen whereby the selective exposure of emulsion on an area of aid polarizing screen is a selective exposure along said polarizing axes of said screen commensurate with the orientation of an image with respect to said area.

20. A method of generating a polarizing screen for photographic animation display as in claim 12 wherein:

the steps of burnishing said screen in second and third directions includes burnishing so that the areas of said screen burnished in any one direction and not overlapped by burnishing in any other direction are approximately equal.

21. A method for generating a printing master for photographic animation display including the steps of:

coating a polarizing material with an adhesive layer;

placing a release paper on said adhesive layer;

viewing a plurality of images through said material;

cutting said material, adhesive and release paper commensurate with said images, at least some of said cuttings being at different predetermined orientations with respect to the axis of polarization of the material;

removing the release paper from the cuttings; and adhering said cuttings to a printing surface in an orientation wherein the axes of polarization of at least some of said cuttings are at predetermined angles of inclination with respect to each other.

22. A polarizing screen for photographic animation display, said screen including:
a sheet of polarizing material;
at least first and second and third intersecting polarization axes established in said material by burnishing, said second axis overlapping said first axis and being formed by burnishing said material at an an angle of not less than 90° with the direction of burnishing to form said first axis and said third polarization axis overlapping said first and second axes and being formed by burnishing said material at an angle not less than 90° with respect to said second axis; and
a radiation responsive emulsion on said sheet, said emulsion being selectively processed commensurate with desired images to be displayed to selectively pass light along said polarization axes in accordance with the direction of polarization of incident light.

23. A polarizing screen as in claim 22 wherein:
said emulsion is selectively processed in areas of said screen to pass only light having predetermined vibration directions, different areas of said screen passing light vibrating in different directions in predetermined order.

24. A polarizing screen as in claim 22 wherein:
the areas of said screen occupied by any of said axes and not overlapped by any other of said axes is approximately equal.

25. A polarizing screen as in claim 24 wherein:
said emulsion is light responsive.

26. A polarizing screen as in claim 24 wherein:
said emulsion is light responsive and pigmented.

27. A polarizing screen as in claim 24 wherein:
said emulsion is a light responsive photoresist material.

28. A polarizing screen as in claim 24 wherein:
said emulsion is light responsive and pigmented with a metallic pigment.

29. A polarizing screen as in claim 28 wherein:
said pigment is aluminum.